United States Patent Office 3,035,371
Patented May 22, 1962

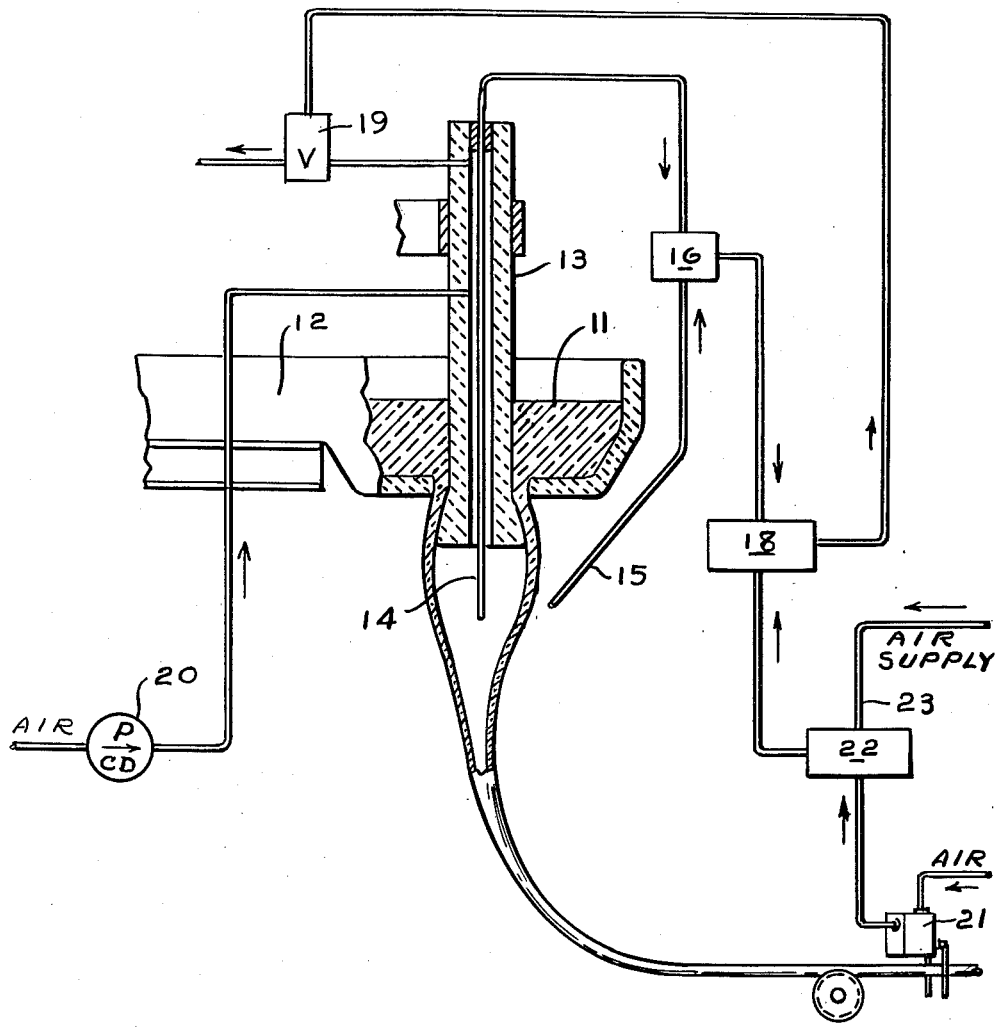

3,035,371
AUTOMATIC CONTROL OF TUBE
DRAWING APPARATUS
Raymond J. Mouly, Corning, N.Y., and Louis A. J. Zangari, Lincoln, R.I., assignors to Corning Glass Works, Corning, N.Y., a corporation of New York
Filed Sept. 30, 1960, Ser. No. 59,666
4 Claims. (Cl. 49—17.1)

The present invention relates to apparatus for drawing tubing from a source of thermoplastic material and more particularly to a novel automatic control system for regulating the outer diameter of such tubing.

Methods for drawing tubing from a source of thermoplastic material are well known in the art. The present automatic control system is particularly applicable to the type of apparatus wherein the dimensions of tubing drawn over a bell and through an annular orifice or over a rotating mandrel are controlled by manipulation of the pressure of air supplied to the interior of the tubing as it is being drawn. Although the present invention will be described in its application to glass-drawing apparatus of the former type, it should be understood that its use is not limited to such apparatus.

Variation in the diameter of drawn glass tubing is a function of several variables, for example, the viscosity of the molten glass, speed of draw, orifice size, depth of the glass in the tank, temperature, moisture content and motion of the atmosphere, and the differential between the pressure maintained inside and outside the tubing while it is still soft enough to be deformable. The present invention comprises a novel control system for the manipulation of the last-mentioned variable so as to maintain constant tubing dimensions regardless of changes in the other variables.

Previous methods for producing tubing of uniform dimensions have consisted either in supplying air at a constant pressure to the interior of the tubing or in varying the internal pressure in response to a signal originating from a mechanical device measuring the outer diameter of the tubing. Each of these methods has an inherent disadvantage. In the former method, since the pressure is maintained at a constant value, the dimensions of the tubing remain subject to changes in the other variables influencing the process. In the latter method, although pressure is varied to offset other process variations, it is varied only in response to information acquired by a mechanical diameter measuring device, and such a device can be utilized only after the tubing has hardened. Consequently, since tubing is being produced continuously, by the time an interval of tubing has hardened sufficiently to permit measurement, a large quantity of defective tubing has already been produced.

In order to avoid the defects in these previously used control systems the present invention provides a novel control system of the cascade type composed of a plurality of interdependent control loops and exhibiting the advantages of each of the prior methods while avoiding their disadvantages. The present control system permits the production of glass tubing having greater precision in outer diameter measurements than has heretofore been attainable. Tubing can be produced having an average deviation from the desired outer diameter which is approximately one-half that found in tubing produced according to prior methods.

In one embodiment of the present invention, a diameter sensing device employing a standard pneumatic position transmitter feeds a pneumatic signal into a first standard pneumatic controller, which will hereinafter be referred to as the diameter controller, which signal varies according to variations in measured diameter. A standard pneumatic signal of predetermined value from an external source is fed into the other input of the diameter controller to preset the controller for the desired tubing diameter. If these two input signals are of differing magnitude, indicating a tube diameter differing from that for which the diameter controller is preset, a change in the magnitude of the output signal from the diameter controller is effected, the magnitude of this output signal being a function of the difference in magnitude between the said input signals. This output signal, which forms one of the two input signals of a second controller identical to the first, which will hereinafter be referred to as the pressure controller, is compared by the pressure controller with a signal emanating from a standard differential pressure gauge and transmitter. The signal from the pressure gauge and transmitter is calibrated so as to be commensurate with the output signal of the diameter controller. Any change in the output signal of the diameter controller, caused by a change in tubing diameter, throws the pressure controller out of balance and causes a change in its output signal. This latter change acts to reposition a pneumatically operated valve which regulates the pressure inside the tubing, thereby effecting a change in the tubing diameter.

Thus, the diameter controller continuously determines the pressure changes which must be effected to offset changes in other process variables and presets the pressure controller accordingly. Pressure variations inside the tubing are thereafter detected at the very point where the tubing is being formed and are corrected immediately by the pressure controller to conform to the value preset by the diameter controller.

The control system of the present invention can best be understood by reference to the accompanying diagram, which represents a sectional view of a simplified form of an apparatus of the kind known to those skilled in the art as a Vello tube drawing apparatus and includes a schematic representation of one embodiment of the control system of the present invention.

Molten glass flowing from reservoir 11 emerges from an annular orifice between tank 12 and bell 13, and, as is well known in the art, then forms a tube with dimensions which depend upon, among other factors, the differential between the pressure inside and outside the tubing. According to the present invention, hollow pressure conducting tubes 14 and 15 transmit these respective pressures to a standard differential pressure gauge and transmitter 16, which in turn emits a pneumatic signal proportional to the differential between said pressures which signal is one input of pneumatic pressure controller 18. Pressure controller 18 is a standard pneumatic controller of the proportional and reset type. If the signal transmitted to pressure controller 18 indicates a pressure differential other than for which the controller is preset, a change is immediately effected in the magnitude of the output signal from controller 18, which operates pneumatic motor valve 19 to adjust the internal pressure in the tubing in the plastic zone, where the tubing is still soft enough to be deformable by variations in pressure differential, by regulating the bleeding of air from the system. Air pressure is continuously provided by fan 20.

Pressure controller 18 is not preset for a single pressure, but, as has been described above, is continually being reset by cooperative action of diameter-sensing unit 21 and diameter controller 22 to compensate for diameter changes resulting from changes in process variables other than pressure. Diameter-sensing device 21 is a standard pneumatic position transmitter capable of emitting a pneumatic signal varying with measured dimensions. The signal emitted from the diameter-sensing device 21 is fed into diameter controller 22 which is identical to pressure controller 18 but which differs therefrom, however, in its function in the system in that it is preset by means of a predetermined standard pneumatic signal 23. This signal is of the same magnitude as that which the diameter-sensing device 21 is known to emit when the tubing measured is of the desired diameter. Diameter controller 22 compares the relative magnitudes of the standard signal and the signal emitted from diameter-sensing device 21 and emits an output signal varying with differences between these two signals. This output signal forms the input signal which presets pressure controller 18. Thus, diameter controller 22 continuously compares a varying signal with a steady signal, while pressure controller 18 continuously compares two varying signals one of which is the output signal from the diameter controller.

Diameter controller 22 is intended to determine the average diameter of the finished tubing. It is not intended that random local variations in the diameter of the tubing should cause a change in the output signal of diameter controller 22. If a short interval of defective tubing with, for example, a diameter greater than desired were permitted to effect a change in the process after the apparatus had ceased to produce oversize tubing, the effect would be to decrease the diameter when the need no longer existed, and the result would be to produce an equal interval of tubing of undersize diameter, which, when it reached diameter sensing device 21, would cause readjustment to produce another interval of oversize tubing. This alternation might continue indefinitely. To avoid this, diameter controller 22 is set to respond to low frequency variations in tubing diameter, while pressure controller 18 is set to respond to high frequency variations in pressure. The result is that diameter controller 22 signals the need for a change in the setting of pressure controller 18 only after defective tubing has been produced for a time sufficient to indicate variations in tubing diameter of other than random nature. The pneumatic controllers utilized in the present invention are provided with manual controls for selecting the desired frequency response.

The pneumatic components utilized in the present invention are standard commercially-available products well known to those skilled in the art. They are described, for example, in bulletins published by the Foxboro Company, Foxboro, Massachusetts. Diameter-sensing device 21 may be the Type CP Position Transmitter, described in Bulletin 458-62a; diameter controller 22 and pressure controller 18 may be the Type M/58 Consotrol Controllers described in Bulletin 13-19; differential pressure gauge and transmitter 16 may be the 15A d/p cell transmitter described in Bulletin 13-29; pneumatic motor valve 19 may be the Type F22 Stabilflo control valve described in Bulletin 5C-10.

It will be understood that the differential pressure gauge and transmitter is not the only possible means for obtaining indirect measurements of diameter variations before the tubing has hardened. Other means having outputs characteristic of diameter variations may be used; for example, optical methods such as the non-contacting tubing gauge disclosed in the copending application of Raymond J. Mouly, Serial No. 816,284, assigned to the assignee of the present application may be employed.

It will also be understood that automatic control systems according to the present invention may comprise more than two loops. Further measurements of tubing diameter can be made at tubing locations more distant from the source than diameter-sensing device 21, for example, after the tubing has cooled to room temperature, and variations from a predetermined standard may be utilized in the above-described manner to effect an output signal to be fed into diameter controller 22 in place of the standard signal 23. In the case of such multiple-loop systems the frequency responses of the various controllers decrease as the distance from the source increases.

Although the present control system has been described as embodied in the form of a series of pneumatically operated components, it will be apparent to those skilled in the art that the system can be operated equally well with components utilizing analogues other than air pressure, as, for example, electrical analogues or the pressures of fluids other than air.

What is claimed is:

1. The combination with an apparatus for drawing tubing from a source of thermoplastic material comprising a container of said thermoplastic material and means drawing tubing with a hollow interior and a predetermined outer diameter from an orifice in said container, of a control system comprising means for measuring the outer diameter of said tubing and for emitting a first signal proportional in magnitude thereto, means for indicating variations between said first signal and a predetermined standard and for transmitting a second signal indicating such variations, means for providing a measurement of a diameter of said tubing in the plastic zone, said means transforming said measurement into a third signal proportional to said measurement and of such nature and so calibrated as to be comparable with said second signal, means for comparing said second and third signals and for emitting a fourth signal varying with the difference between said second and third signals and means responsive to said fourth signal for varying the pressure in the interior of said tubing in the plastic zone.

2. The combination with an apparatus for drawing tubing from a source of themoplastic material comprising a container of said thermoplastic material and means drawing tubing with a hollow interior and a predetermined outer diameter from an orifice in said container, of a control system comprising means for measuring the outer diameter of said tubing and for emitting a first signal proportional in magnitude thereto, means for indicating variations between said first signal and a predetermined standard and for transmitting a second signal indicating such variation, means for providing a measurement of a differential in air pressure between the interior of said tubing and an area immediately outside thereof, said means transforming said measurement into a third signal proportional to said measurement and of such nature and so calibrated as to be comparable with said second signal, means for comparing said second and third signals and for emitting a fourth signal varying with the difference between said second and third signals and means responsive to said fourth signal for varying the pressure in the interior of said tubing.

3. The combination with an apparatus for drawing tubing from a source of thermoplastic material comprising a container of said thermoplastic material and means drawing tubing with a hollow interior and a predetermined outer diameter from an orifice in said container, of a control system comprising a pneumatic position transmitter for measuring the said outer diameter of said tubing and for emitting a first signal proportional in magnitude thereto, a first pneumatic controller for indicating variations between said first signal and a predetermined standard and for transmitting a second signal indicating such variations, means for measuring the diameter of said tubing in the plastic zone and for emitting a third pneumatic signal proportional to said diameter and of such nature and so calibrated as to be comparable with said second signal, a second pneumatic controller for comparing said second and third signals and for emitting a fourth signal varying with the difference between said second and third signals and a pneumatic motor valve responsive to said fourth signal for varying the pressure in the interior of said tubing in the plastic zone.

4. The combination with an apparatus for drawing tubing from a source of thermoplastic material comprising a container of the said thermoplastic material and means drawing tubing with a hollow interior and a predetermined outer diameter from an orifice in said container.

of a control system comprising a pneumatic position transmitter for measuring the said outer diameter of said tubing and for emitting a first signal proportional in magnitude thereto, a first pneumatic controller for indicating variations between said first signal and a predetermined standard and for transmitting a second signal indicating such variations, a pneumatic pressure gauge and transmitter for providing a measurement of the differential in air pressure between the interior of said tubing and an area immediately outside thereof, said pneumatic pressure gauge and transmitter transforming said measurement into a third signal proportional thereto and of such nature and so calibrated as to be comparable with said second signal, a second pneumatic controller for comparing said second and third signals and for emitting a fourth signal varying with the difference between said second and said third signals and a pneumatic motor valve responsive to said fourth signal for varying the pressure in the interior of said tubing.

References Cited in the file of this patent
UNITED STATES PATENTS

| | | |
|---|---|---|
| 2,150,017 | Barnard | Mar. 7, 1939 |
| 2,884,531 | Bosch | Apr. 28, 1959 |